(12) United States Patent
Pahlevaninezhad et al.

(10) Patent No.: US 9,590,531 B2
(45) Date of Patent: Mar. 7, 2017

(54) ZVS VOLTAGE SOURCE INVERTER WITH REDUCED OUTPUT CURRENT RIPPLE

(71) Applicants: Majid Pahlevaninezhad, Kingston (CA); Shangzhi Pan, Kingston (CA); Praveen Jain, Kingston (CA)

(72) Inventors: Majid Pahlevaninezhad, Kingston (CA); Shangzhi Pan, Kingston (CA); Praveen Jain, Kingston (CA)

( * ) Notice: Subject to any disclaimer, the term of this patent is extended or adjusted under 35 U.S.C. 154(b) by 140 days.

(21) Appl. No.: 14/621,736

(22) Filed: Feb. 13, 2015

(65) Prior Publication Data

US 2015/0236617 A1    Aug. 20, 2015

Related U.S. Application Data

(60) Provisional application No. 61/940,029, filed on Feb. 14, 2014.

(51) Int. Cl.
*H02M 7/5387* (2007.01)
*H02M 1/14* (2006.01)
*H02M 1/00* (2006.01)

(52) U.S. Cl.
CPC .......... *H02M 7/5387* (2013.01); *H02M 1/14* (2013.01); *H02M 7/53871* (2013.01); *H02M 2001/0054* (2013.01); *H02M 2001/0058* (2013.01); *Y02B 70/1491* (2013.01)

(58) Field of Classification Search
CPC ....... H02M 2001/0058; H02M 7/5387; H02M 7/53871; H02M 7/53873; H02M 2001/0051; H02M 2001/346; Y02B 70/1441
See application file for complete search history.

(56) References Cited

U.S. PATENT DOCUMENTS

| | | | | |
|---|---|---|---|---|
| 5,852,558 A | * | 12/1998 | Julian | H02M 7/5387 363/132 |
| 7,609,532 B1 | * | 10/2009 | Schutten | H02M 7/53871 363/132 |
| 2005/0041439 A1 | * | 2/2005 | Jang | H02M 7/5387 363/17 |
| 2014/0268908 A1 | * | 9/2014 | Zhou | H02M 7/5381 363/21.03 |

* cited by examiner

*Primary Examiner* — Harry Behm
(74) *Attorney, Agent, or Firm* — Brion Raffoul

(57) ABSTRACT

Systems, methods, and devices relating to DC/AC converters. A circuit including a full bridge inverter is provided. One leg of power semiconductor subcircuits of the inverter is switched at line frequency while the other leg is soft switched at a higher frequency using an auxiliary circuit. A control system is used to calculate this higher optimal frequency. To minimize the output current ripple in the output filter, the output inductor is coupled to the auxiliary inductor in the auxiliary circuit.

18 Claims, 12 Drawing Sheets

ZVS VOLTAGE SOURCE INVERTER WITH REDUCED OUTPUT CURRENT RIPPLE

RELATED APPLICATIONS

This application is a non-provisional of U.S. Provisional Patent Application No. 61/940,029 filed Feb. 14, 2014.

TECHNICAL FIELD

The present invention relates to circuit and control systems of DC/AC converters. More particularly, the present invention relates to methods, circuits, and devices for use in DC/AC converters to ensure zero voltage switching and to provide optimal operation of the output filter.

BACKGROUND OF THE INVENTION

DC/AC converters are commonly used for various applications such as renewable power conditioning systems, electric vehicles, etc. In particular, DC/AC inverters are widely used as the second stage in two-stage renewable energy power conditioning systems. The DC/AC inverter usually operates under hard-switching where neither the voltage nor the current of the power switches is zero during the switching transitions. The power semiconductors of the DC/AC inverter are switched under very high voltage at the intermediate DC-bus (usually more than 400V). Switching losses of the power semiconductors in such inverters significantly contribute to the overall losses of the power conditioning system. In particular, reverse recovery losses of the power semiconductors' body diodes are inevitable for such topologies. Because of this, the switching frequency of the inverter is very limited, usually in the range of 10-20 kHz. Because of strict regulatory standards, a high quality current needs to be injected into the utility grid from such inverters. To accomplish this, such inverters require large filters at their outputs. Another issue with low switching frequencies is that such low frequencies create a high amount of current ripple across the inverter output inductor. This current ripple not only increases the core losses of the inductor but it also increases the inductor's high frequency copper losses. In addition to this, reducing the DC-bus voltage creates a significant amount of conduction and emission EMI noise. The high amount of conduction and EMI noise may affect the operation of the control system and may highly degrade the system's reliability. From all of the above, hard-switching limits the switching frequency of the converter and imposes a substantial compromise in the design of the output filter and in the overall performance of the power conditioning systems.

There are many different soft-switching techniques reported in the literature. However, these techniques generally require many extra active/passive circuits. In particular, extra active circuits highly deteriorate the reliability of the system due to the additional complexity imposed by the active components. Also, the effectiveness of these techniques is questionable. Some studies have shown that some soft-switching techniques may add more losses to the converter and, consequently, greatly offset their advantages. Because of this, most industrial products use the more conventional hard-switching inverters with large filters in order to ensure a reliable power conditioning system. Even though the system's performance is highly compromised with hard-switching and bulky lossy filters, industrial decision makers prefer to use a reliable, well-known solution for the inverter.

Auxiliary circuits have previously been used to provide soft-switching conditions for the power semiconductors of a voltage source inverter. Such soft-switching circuits usually use a combination of active and passive circuits in order to provide soft-switching conditions. Generally, active circuits increase the complexity of the power circuit and reduce the reliability of the systems. In addition to this issue, losses related to the auxiliary circuits usually highly offset the advantages of the soft-switching and compromise the converter performance. Usually, auxiliary circuits include a resonant circuit with very high amount of peak current/voltage. From the above, it should be clear that significant amounts of losses are attributed to the auxiliary circuit. As well, it should be clear that passive components should be able to withstand the high amounts of currents and voltages during switching transitions.

In these inverters, the current ripple across the output inductor creates significant amount of power losses. The impact of this current ripple on the power losses is two-fold. First, the current ripple produces core losses and, second, the current ripple also increases the high frequency ohmic losses of the converter. Usually, magnetic wires are used to wind the output inductors. The magnetic wires show a significant resistance to the high frequency current. In conventional designs, the current ripple is usually kept very small so that only a negligible high frequency current ripple is produced. As well, in conventional designs, the current ripple is usually kept very small so that only a small amount of the attributed high frequency ohmic losses are produced Unfortunately, another restriction is that, in high power density designs, the inductor cannot be very bulky.

What is needed is a simple and practical solution which provides soft-switching for the power semiconductors and simultaneously does not compromise system reliability. Also, the high frequency current component of the output inductor should be limited in order to provide a high power density converter with superior efficiency. It is therefore preferable to only use passive components for soft-switching the power semiconductors and to also reduce the high frequency component of the inverter output current. Also, another preference is to optimize (or minimize) any losses associated with the extra passive components. Such preferred optimized losses due to the extra components should not offset the advantages of soft-switching.

SUMMARY OF INVENTION

The present invention provides systems, methods, and devices relating to DC/AC converters. A circuit including a full bridge inverter is provided. One leg of power semiconductor subcircuits of the inverter is switched at line frequency while the other leg is soft switched at a higher frequency using an auxiliary circuit. A control system is used to calculate this higher optimal frequency. To minimize the output current ripple in the output filter, the output inductor is coupled to the auxiliary inductor in the auxiliary circuit.

In a first aspect, the present invention provides a circuit comprising:
- a DC bus capacitor;
- a full bridge inverter coupled in parallel to said DC bus capacitor between a positive node and at a negative node;
- an output filter coupled to said full bridge inverter;
- an auxiliary circuit coupled to said inverter;
- wherein
- said full bridge inverter comprises a first leg and a second leg, each leg comprising a pair of power semiconductor subcircuits coupled in series to each other, said first leg having its pair of power semiconductor subcircuits being coupled to each other at a first coupling point, said second leg having its pair of power semiconductor subcircuits being coupled to each other at a second coupling point;

said auxiliary circuit comprises an auxiliary inductor coupled in series to an auxiliary capacitor, said auxiliary circuit being coupled between said first coupling point and said negative node;

said output filter comprises an inductor, said output filter being coupled between an output and said first coupling point, said output also being coupled between said output filter and said second coupling point.

In a second aspect, the present invention provides a method for controlling a DC/AC converter having a full bridge inverter and being connected to a power grid, said inverter having a first and a second leg of power semiconductor subcircuits, the method comprising:

a) switching said power semiconductors in said second leg at a frequency of current in said power grid;

b) switching said power semiconductors in said first leg at a frequency higher than said frequency of said current in said power grid;

c) providing an auxiliary circuit for providing soft switching to said power semiconductors in said first leg.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
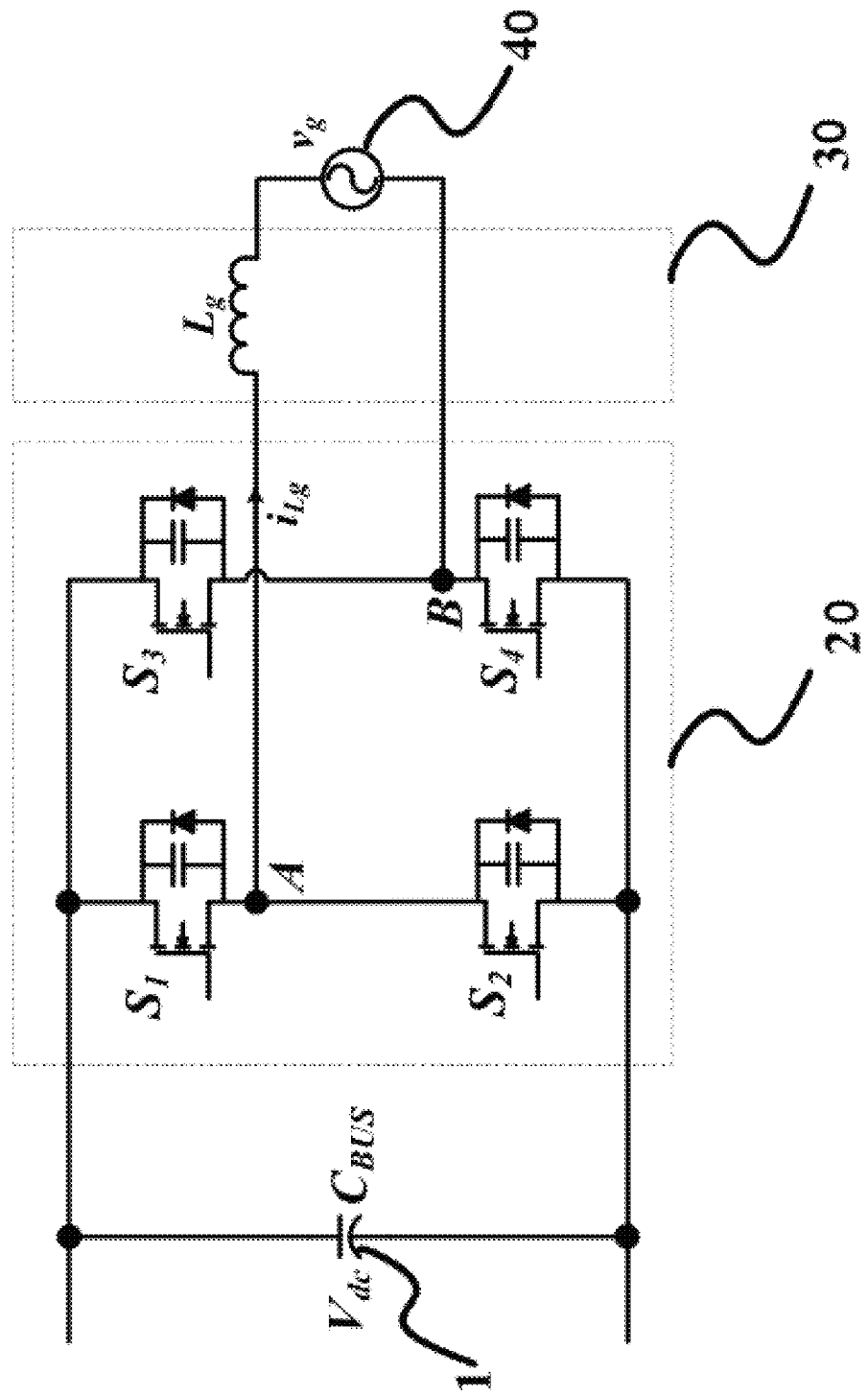
FIG. 1 illustrates a single-phase voltage inverter circuit.

The present invention relates to DC/AC converters and in particular to voltage source inverters. The invention may be implemented in single-phase power conditioning systems used in different applications such as grid-connected inverters used in renewable energy systems.

In order to overcome the shortcomings associated with the hard-switched DC/AC (Direct Current/Alternative Current) inverter and the high amount of current ripple across the output inductor, presented as one aspect of the invention is a grid-connected soft-switched DC/AC inverter with reduced output current ripple.

The invention comprises a full-bridge inverter, a passive auxiliary circuit, an output filter, and a control system. The control system is responsible for optimally controlling the current through the auxiliary circuit as well as for injecting a high quality current to the utility grid. The auxiliary circuit provides reactive current in order to provide Zero Voltage Switching (ZVS) condition for the power semiconductors in the full bridge inverter. In one leg of the full bridge inverter, the reactive current charges the output capacitor of one power semiconductor and discharges the output capacitor of the other semiconductor during switching transitions. This way, the semiconductors are switched on at zero voltage. This eliminates the switching losses of the power semiconductors at turn-on and also removes the reverse recovery losses of the body diodes of the power semiconductors. The control approach in the present invention simultaneously controls the output current of the DC/AC inverter and the current through auxiliary circuit. The control approach adjusts the duty ratio of the gate pulses applied to the power semiconductors in order to control the output current of the DC/AC inverter and also adjusts the switching frequency of the gate pulses of the power semiconductors in order to control the current through the auxiliary circuit. The switching frequency is controlled in a specific way to optimize the amount of current flowing through the auxiliary circuit. By controlling the duty ratio and adjusting the switching frequency of the gate pulses, losses associated with the auxiliary circuit are minimized. The particular structure of the auxiliary circuit also provides significant attenuation of the output inductor current ripple. This allows for a very high quality current to be injected into the grid with minimized losses of the output inductor. This present invention therefore takes advantage of the current ripple across the output inductor to provide soft-switching for the power semiconductors. The output current ripple is thereby attenuated and the power semiconductors operate with soft-switching.

In one aspect, this invention provides soft-switching circuits along with control methods for a single-phase voltage source inverter.

Switching losses are one of the main sources of power losses in a single-phase voltage source inverter. Switching losses are due to the overlap between the voltage across the power semiconductor and the current flowing through the power semiconductor during switching transitions. Switching losses are proportionally related to the switching frequency of the converter. In order to have a reasonable amount of losses, the switching frequency of the converter is limited, depending on the application (the switching frequency is usually between 10-20 kHz). Voltage source inverters operating with low switching frequency require a large filter in order to attenuate the switching noise and to produce a high quality output current. In addition, a high amount of current ripple caused by low switching frequency across the filter inductor causes a high amount of core losses in the filter inductor. There are several other disadvantages to current voltage source inverters such as high amount of EMI (electromagnetic interference), a noisy and unreliable control system, and a limited control bandwidth, imposed by hard-switching of the power semiconductors in a voltage source inverter. Accordingly, soft-switching techniques can effectively eliminate the disadvantages of hard-switched inverter and offer substantial improvements in the performance of the voltage source inverter.

This invention uses passive auxiliary circuits in conjunction with specific control methods to provide soft-switching conditions, with a minimized ripple across the output inductor. In particular, the auxiliary circuit along with the specific control methods are used in order to provide soft-switching for a single-phase voltage source inverter and to significantly attenuate the ripple across the output inductor.

Referring to FIG. 1, an exemplary arrangement of a single-phase voltage source inverter is illustrated. According to FIG. 1, the single-phase voltage source inverter includes a DC-Bus Capacitor 1, a full bridge inverter 20, an L-Filter 30 as the output filter (an inductor $L_g$). The inverter is connected to the Grid 40. As can be seen, the full bridge inverter has two legs, each having two power semiconductors. The first leg has power semiconductor subcircuits S1 and S2 while the second leg has power semiconductor subcircuits S3 and S4. The L-filter 30 is coupled to the first leg at connection point A between the power semiconductor subcircuits S1 and S2. The grid 40 is coupled to the inductor $L_g$ at one end and to the connection point B at the other end. Connection point B is located between power semiconductor subcircuits S3 and S4. The DC-Bus capacitor 1 is coupled in parallel to the full bridge inverter 20.

The single-phase voltage source inverter can operate with either bi-polar voltage switching or uni-polar voltage switching. In bi-polar inverters, the output voltage of the inverter is switched between $+V_{dc}$ and $-V_{dc}$. In uni-polar inverters, the inverter output voltage is switched between either $-V_{dc}$ and 0 or 0 and $-V_{dc}$.

Figure 2:
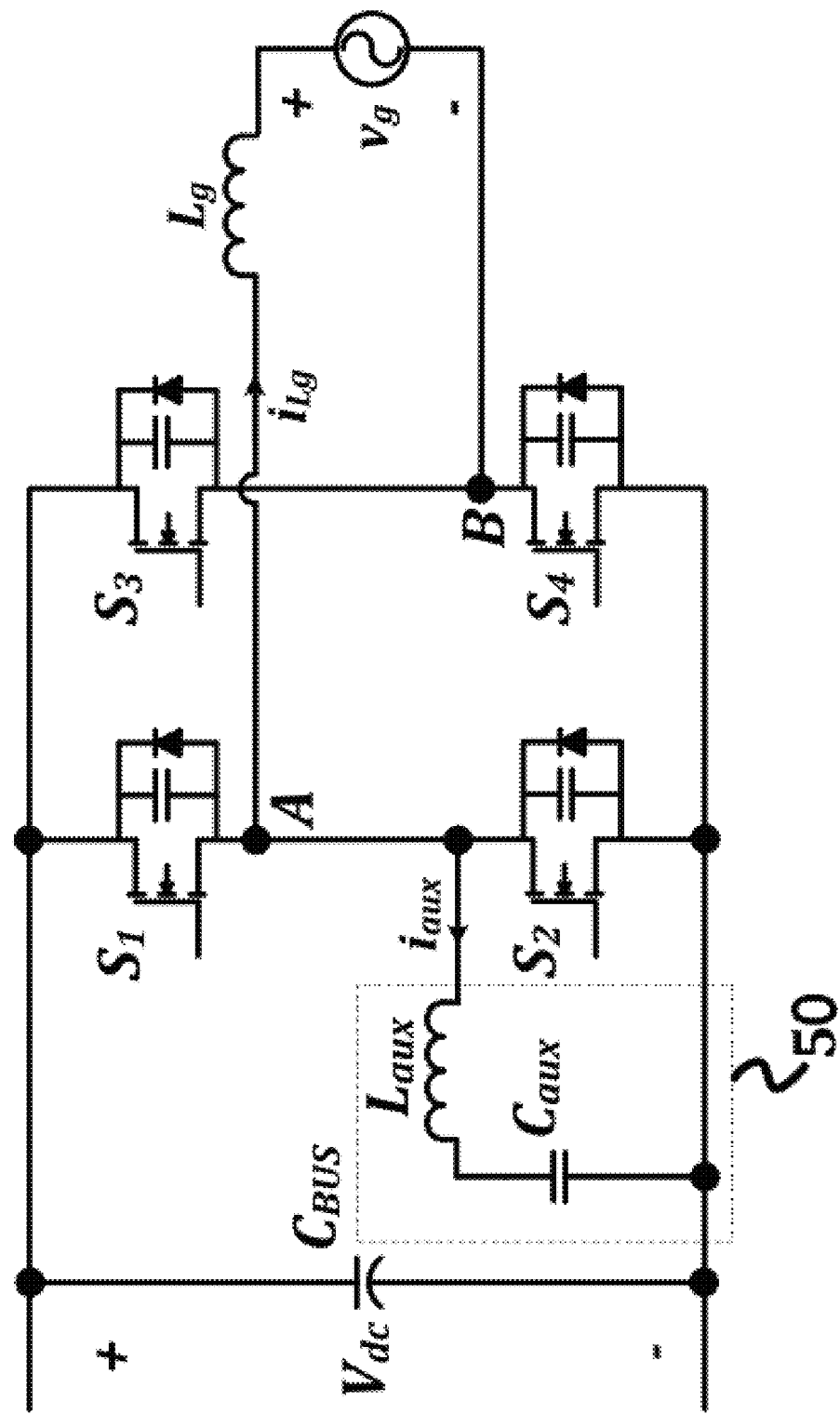
FIG. 2 shows the circuit of FIG. 1 with a passive auxiliary circuit to result in a zero voltage switching voltage source inverter.

Referring to FIG. 2, a ZVS voltage source inverter topology according to one aspect of the invention is illustrated. This topology uses a passive auxiliary circuit 50 to provide ZVS for one leg of the voltage source inverter. The circuit in FIG. 2 is similar to the circuit in FIG. 1 with the exception that the auxiliary circuit 50 has been added. The auxiliary circuit 50 has an auxiliary inductor $L_{aux}$ in series with an auxiliary capacitor $C_{aux}$. The auxiliary circuit is coupled between connection point A and the negative lead of the DC-bus capacitor 1.

Figure 3:
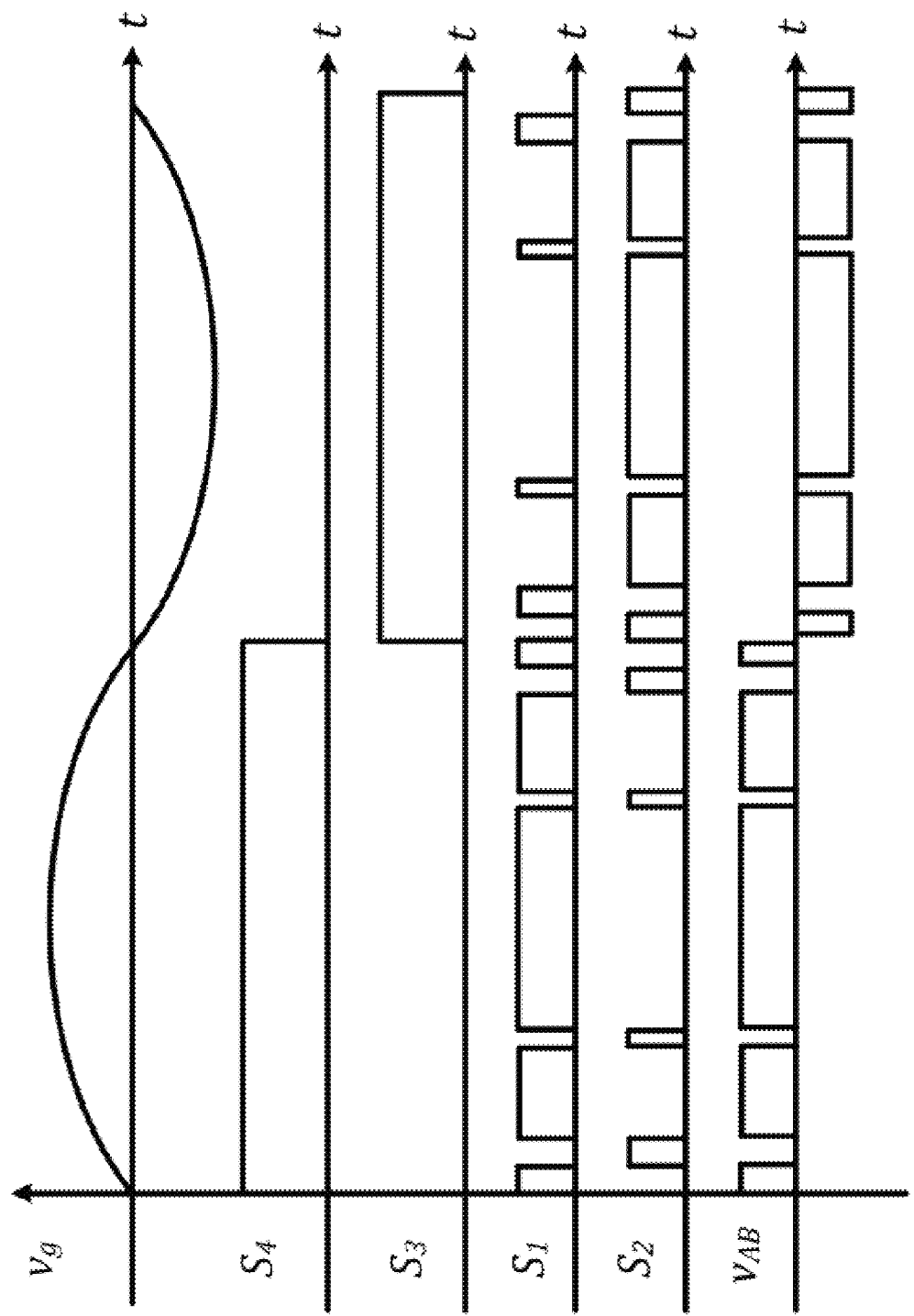
FIG. 3 shows the various gate control signals for controlling the various power semiconductors in the circuit of FIG. 2.

In operation, the circuit in FIG. 2 has the voltage source inverter controlled such that the first leg (with power semiconductor subcircuits $S_1$ and $S_2$) is switched with high switching frequency while the second leg (with power semiconductor subcircuits $S_3$ and $S_4$) is switched with the line frequency of the grid. This line frequency can be the voltage frequency or the current frequency of the power grid. During the entire positive cycle, the power semiconductor $S_4$ remains on while the power semiconductor $S_3$ is off. For the entire negative cycle, the power semiconductor $S_3$ is on while the power semiconductor $S_4$ is off. Referring to FIG. 3, the various gate signals required to control the grid connected voltage source inverter shown in FIG. 2 are shown. As can be seen, when power semiconductor $S_3$ is on, power semiconductor $S_4$ is off and vice versa. This way of controlling the voltage source inverter has different advantages over the conventional bi-directional switching voltage source inverter. One of the main advantages is that two of the power semiconductors do not have any switching losses due to the fact that they are switching at the line frequency (50/60 Hz) of the grid. The other important feature of this control technique is the higher gain provided by the uni-polar switching of the inverter output voltage. This particular topology only requires one auxiliary circuit to provide soft-switching. The extra current flowing through the auxiliary circuit therefore only flows through one leg instead of both legs of the inverter. This results in lower power losses.

Figure 4:
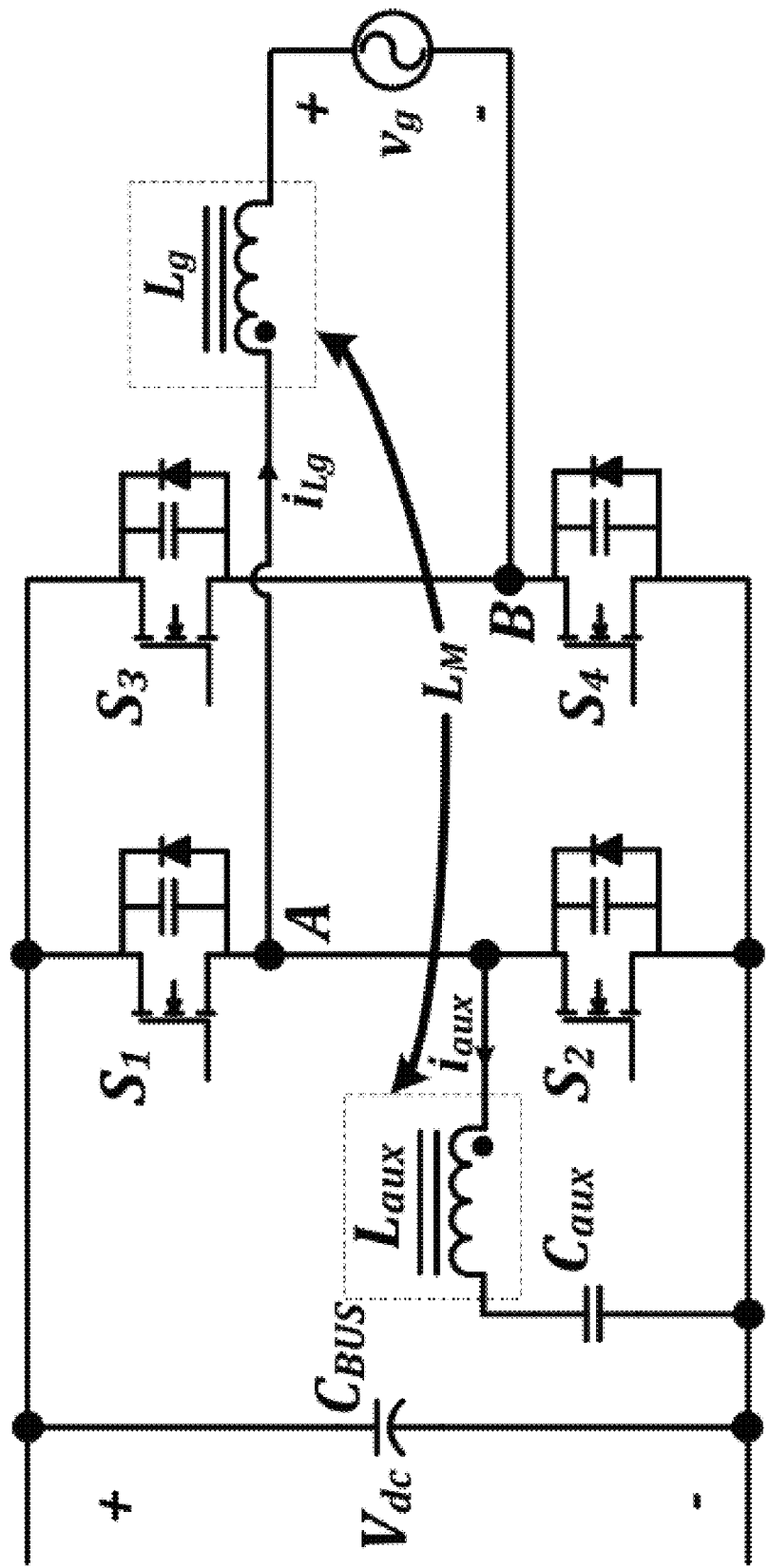
FIG. 4 is a diagram of a ZVS grid-connected voltage source inverter with ripple cancellation for the output inductor.

The current ripple across the output inductor $L_g$ causes significant power losses. The current ripple produces core losses as well as high frequency copper losses. Since the switching frequency is limited for hard-switching voltage source inverters, usually a bulky inductor is used for the inverter-side inductor. Referring to FIG. 4, illustrated is a circuit according to another aspect of the invention. FIG. 4 shows a ZVS grid-connected voltage source inverter with ripple cancellation for the output inductor. As can be seen, the circuit in FIG. 4 is virtually identical to the circuit in FIG. 2 with the exception that the output inductor $L_g$ is now coupled to the auxiliary inductor $L_{aux}$. This topology uses the energy of the inverter side ripple to provide ZVS for the power semiconductors. The advantages of this topology are two-fold: the power semiconductors are soft-switched and the current ripple and losses associated with the output inductor $L_g$ are significantly attenuated.

It should be noted that the coupled output inductor $L_g$ and auxiliary inductor $L_{aux}$ can be coupled in various ways. In one embodiment, the inductors are magnetically coupled to one another by being wound on the same core in a specific manner such that this produces a certain self-inductance for each inductor as well as mutual inductance for each other.

The coupling between the two inductors, $L_g$ and $L_{aux}$ is able to effectively attenuate the current ripple of the output inductor $L_g$ and is also able provide a high quality current for the grid. The current ripple of the output inductor without the coupling is given by:

$$\frac{di_g}{dt} = \frac{V_{dc} - v_g}{L_g} \quad (1)$$

for $$0 \leq t \leq dT$$

The current ripple of the inductor current with the coupling is given by:

$$\frac{di_g}{dt} = \frac{V_{dc} - v_g}{L_g}\eta \quad (2)$$

for $$0 \leq t \leq dT$$

where $\eta$ is defined by:

$$\eta = \frac{1 - L_M/L_{aux}}{1-k^2}; \quad (3)$$

$$k = \frac{L_M}{\sqrt{L_g L_{aux}}}$$

Therefore, the ripple is attenuated by the factor of $\eta$.

According to FIG. 4, the dynamics of the auxiliary inductor current is given by:

$$\frac{di_{aux}}{dt} = \frac{V_{dc} - v_g}{L_{aux}}\xi \quad (4)$$

for $$0 \leq t \leq dT$$

where ξ given by:

$$\xi = \frac{1 - L_M / L_g}{1 - k^2}; \quad (5)$$

$$k = \frac{L_M}{\sqrt{L_g L_{aux}}}$$

The current flowing through the auxiliary circuit should be enough to provide soft-switching for the power semiconductors, $S_1$ and $S_2$. The peak value of the auxiliary circuit current derives as:

$$I_p = \frac{(V_{dc} - |v_g|)d}{2 L_{aux} f_{sw}} \quad (6)$$

In the present invention, the switching frequency of $S_1$ and $S_2$ is controlled such that the current flowing through the auxiliary circuit is optimized. According to Equation (6), the optimal value of the switching frequency is given by:

$$f_{sw}^{Opt} = \frac{(V_{dc} - |v_g|)d}{2 L_{aux} \left( I_{ZVS} + \left| I_o - \frac{(V_{dc} - |v_g|)d}{2 L_g} \eta \right| \right)} \quad (7)$$

where $$I_{ZVS} = C_{So} \frac{V_{dc}}{t_d} \quad (8)$$

In Equation (8), $C_{So}$ is the equivalent output capacitance of the power semiconductors, $S_1$ and $S_2$, and $t_d$ is the dead-time between the gate pulses of the power semiconductors, $S_1$ and $S_2$.

For greater clarity, in the above equations, $L_M$ is a mutual inductance of the auxiliary inductor and the output inductor,
$L_g$ is a self inductance of the output inductor,
$L_{aux}$ is a self inductance of the auxiliary inductor,
$C_{So}$ is an equivalent output capacitance of the power semiconductors,
$V_{dc}$ is an input voltage of the inverter,
$V_g$ is the grid voltage,
$t_d$ is a dead time between pulses of the power semiconductors, and
d is the duty ratio.

The topologies according to the various aspects of the present invention require a specific control system. Conventional control techniques are not able to provide a high quality current at the output of the converter. Since the power semiconductors $S_3$ and $S_4$ are switched every time the line cycle transitions from positive to negative and from negative to positive, the control changes this direction. It should be noted that for positive line cycles, a larger duty ratio results in a higher absolute value for the output current.

For the negative line cycles, a larger duty ratio results in lower absolute values for the output current. This causes significant current distortions at zero crossings of the voltage.

Figure 5:
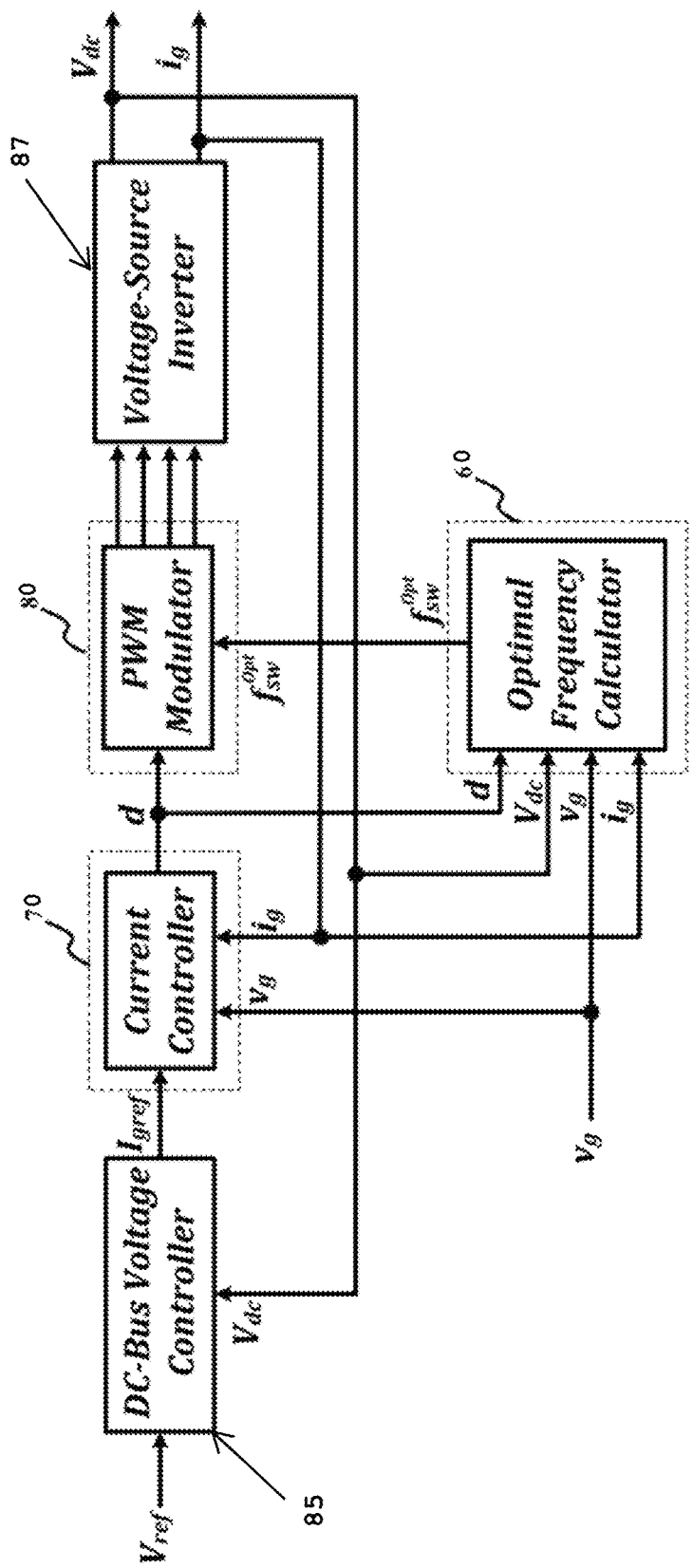
FIG. 5 a block diagram of a closed loop control system for controlling the circuit in FIG. 4.

FIG. 5 shows the block diagram of the closed-loop control system for the ZVS voltage source inverter according to another aspect of the invention. In FIG. 5, the closed-loop control system includes a control loop which adjusts the duty ratio d and a control loop which determines the optimal switching frequency $f_{sw}$. The control system illustrated in FIG. 5 includes three novel blocks: an Optimal Frequency Calculator 60, a Current Controller 70, and a PWM Modulator 80. The Optimal Frequency Calculator 60 is implemented based on Equation (7). As can be seen from FIG. 5, a reference voltage $V_{ref}$ is received by the DC-Bus Voltage Controller 85 along with a feedback signal Vdc which is one of the inputs of the voltage source inverter 87. A current output $I_{gref}$ from this controller 85 is received by the current controller 70 along with a voltage $v_g$ from grid and a current $i_g$ feedback from the voltage source inverter 87. The output of the current controller 70 is a signal d which is fed into the PWM Modulator 80 and to the optimal frequency calculator 60. The outputs of the PWM Modulator 80 are the control signals for the various power semiconductor subcircuits in the inverter 87. The optimal switching frequency $f_{sw}$ is output from the optimal frequency calculator 60 to the PWM Modulator 80. The optimal frequency calculator 60 receives, as input, the value d from the current controller 70, the inverter voltage input $V_{dc}$ and the current output $i_g$ from the voltage-source inverter 87, and the grid voltage $v_g$.

Figure 6:
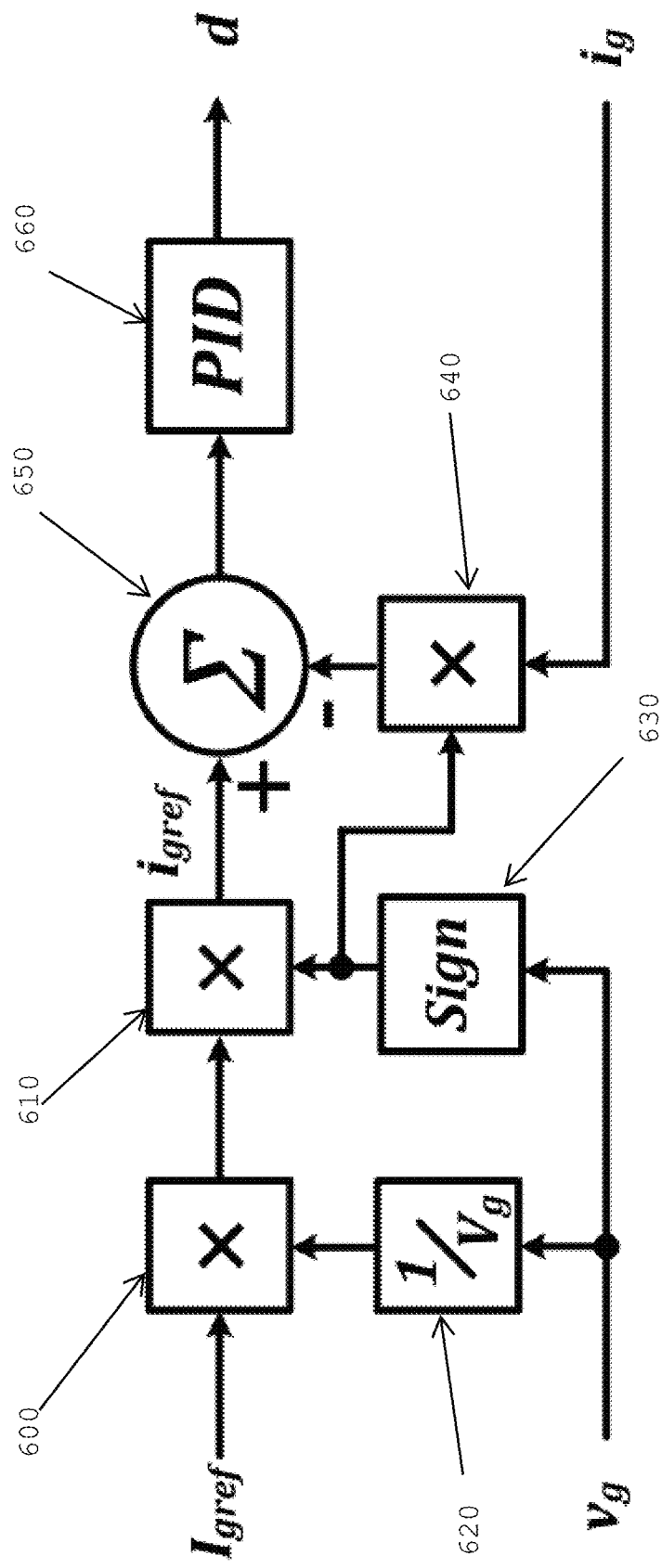
FIG. 6 is a detailed block diagram of the current controller illustrated in FIG. 5.

Referring to FIG. 6, a detailed block diagram of Current Controller 70 is presented. The current controller 70 has, as input, the intermediate current $I_{gref}$ and the grid voltage $v_g$. The current $I_{gref}$ is fed into a multiplier block 600 and the result of this multiplier block is fed into another multiplier block 610. The input grid voltage $v_g$ is fed into the inverse block 620 that feeds the value of $1/V_g$ into the first multiplier block 600. The input grid voltage is also fed into a sign block 630 that extracts the sign of the voltage $v_g$. The result of the sign block 603 is fed into the multiplier blocks 610 and 640. Also fed into multiplier block 640 is the grid current $i_g$. The output of multiplier block 640 is subtracted from the output of multiplier block 610 by adder 650. The result of adder 650 is sent to a PID (proportional-integral-derivative) controller 660. The output of PID controller is the value d.

As can be seen from FIG. 6, the input current $I_{gref}$ is multiplied by the inverse of the input grid voltage $v_g$. If the grid voltage is negative, then the current sent to the adder 650 becomes positive as the grid voltage is multiplied by its sign by way of multiplier block 610. Because of this arrangement, the current $i_{gref}$ added by way of adder 650 is always positive.

For the control system illustrated in FIG. 5, due to the change in the control direction in each half cycle, the impact of this change in direction should be taken into account in order to provide a stable control loop. The current controller shown in FIG. 6 preserves the direction of the control input d during each half line cycle transitions.

Figure 7:
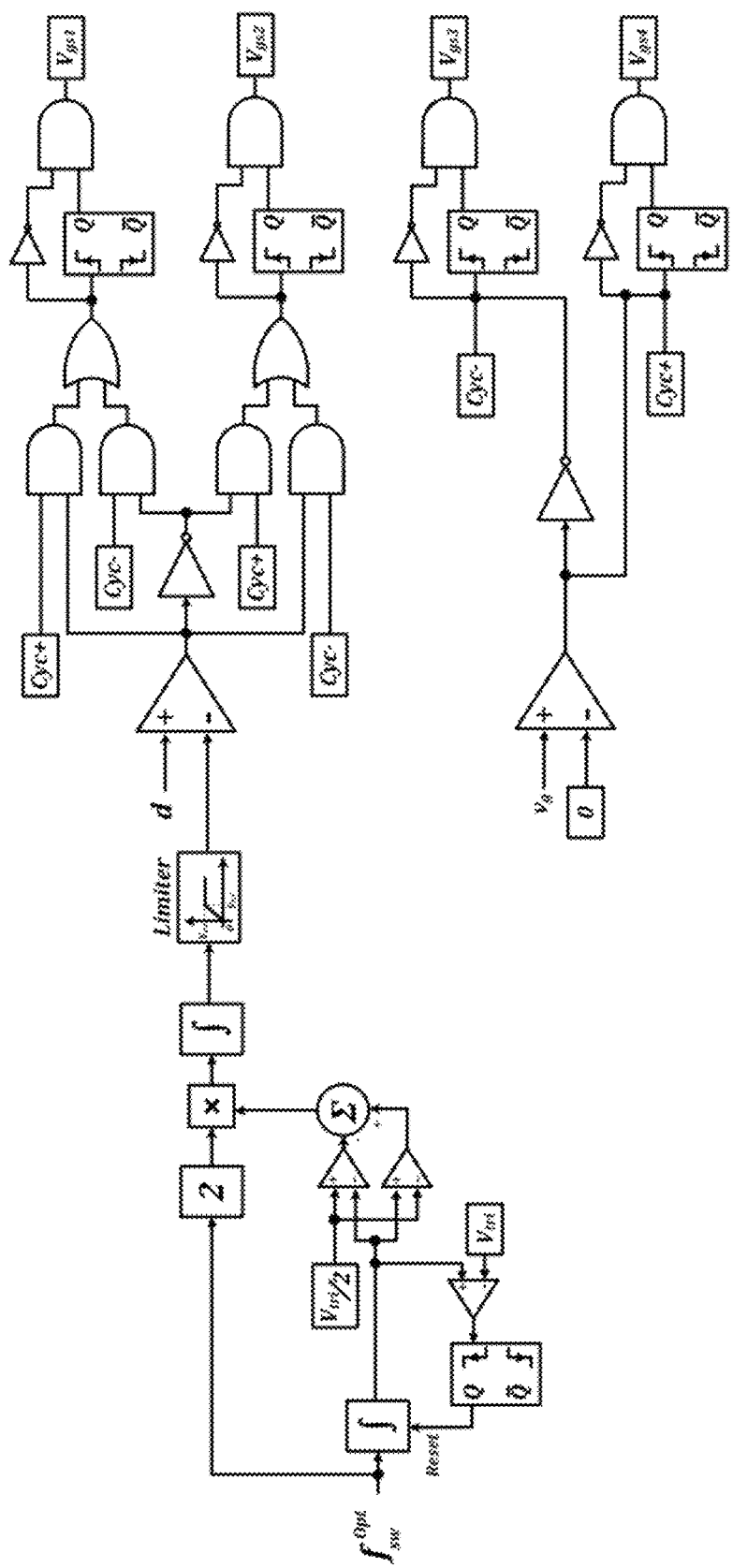
FIG. 7 is a block diagram of the PWM modulator illustrated in FIG. 5.

FIG. 7 shows the block diagram of the PWM modulator according to another aspect of the invention. As noted above, the PWM modulator provides the control or gate signals for the four power semiconductor subcircuits in the inverter. According to FIG. 7, the gate signals, $v_{gs1}$ and $v_{gs2}$ are controlled such that the duty ratio is switched at the zero crossings of the grid voltage. In this way, the direction of the control is preserved. Also, FIG. 7 shows how the frequency of the triangular signal of the modulator follows the optimal switching frequency determined by Equation 7. In FIG. 7, Cyc+ and Cyc− represent the positive and negative line cycles respectively and $V_{tri}$ represents the amplitude of the triangular signal of the modulator of the present invention.

Figure 8:
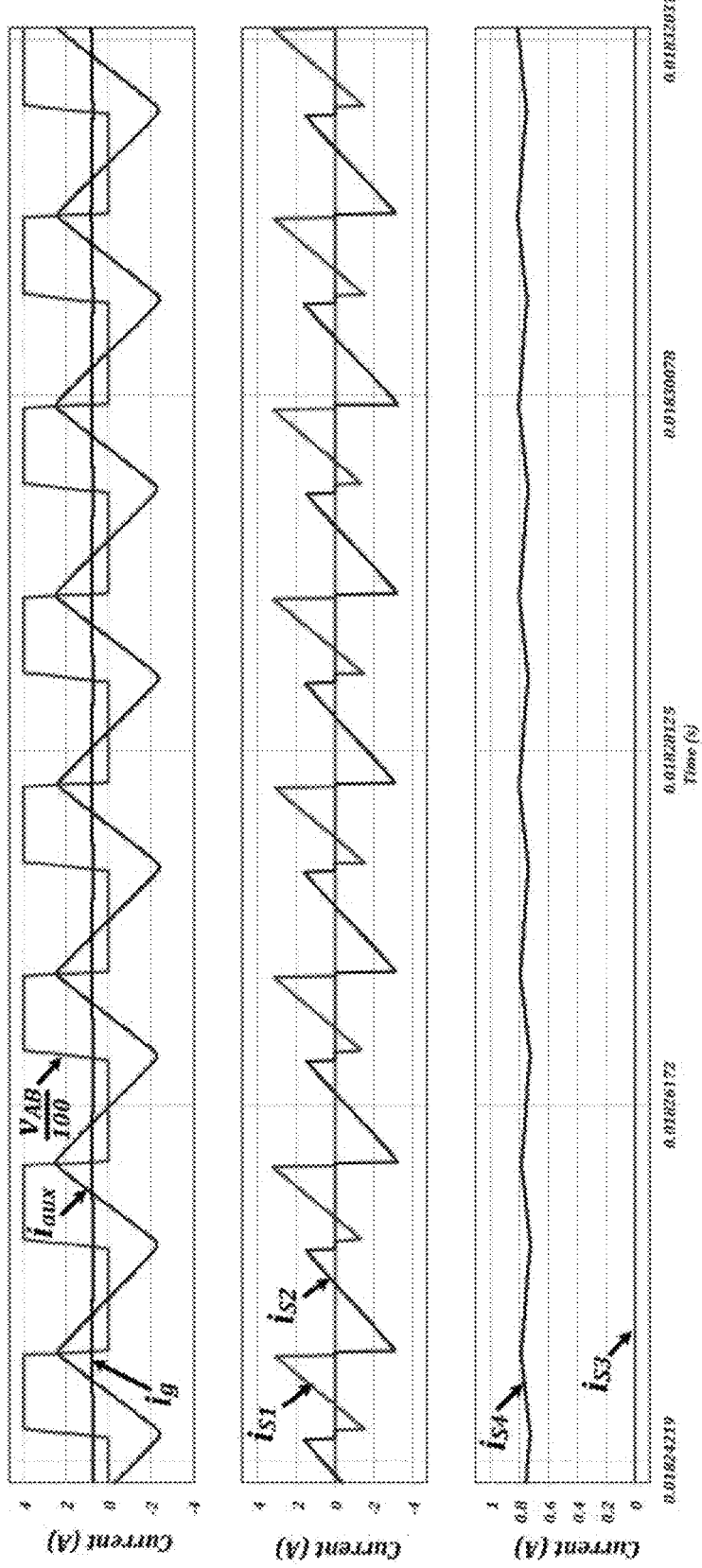
FIG. 8 shows the auxiliary current waveform and the ZVS operation of the semiconductors in the circuit of FIG. 4.
Figure 9:
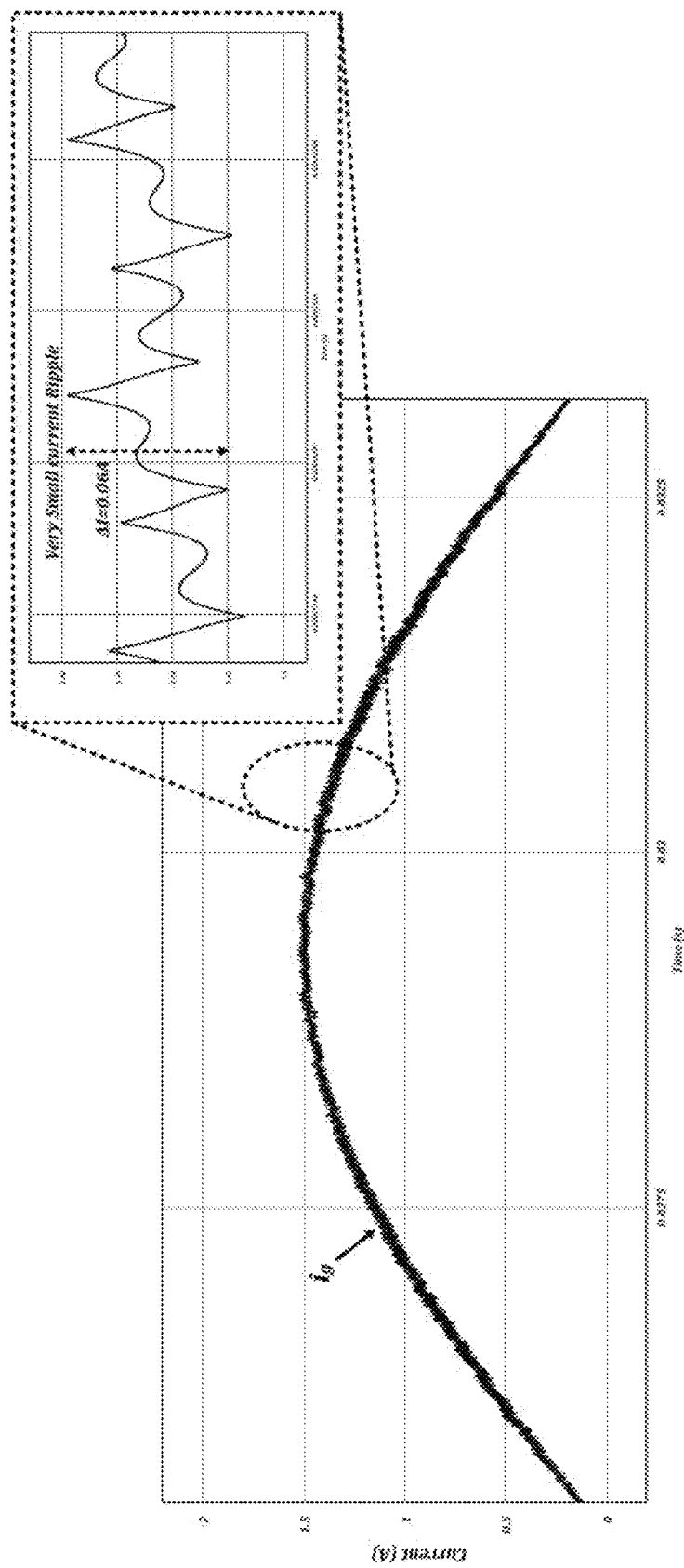
FIG. 9 illustrates the current ripple of the output inductor for the circuit in FIG. 4.
Figure 10:
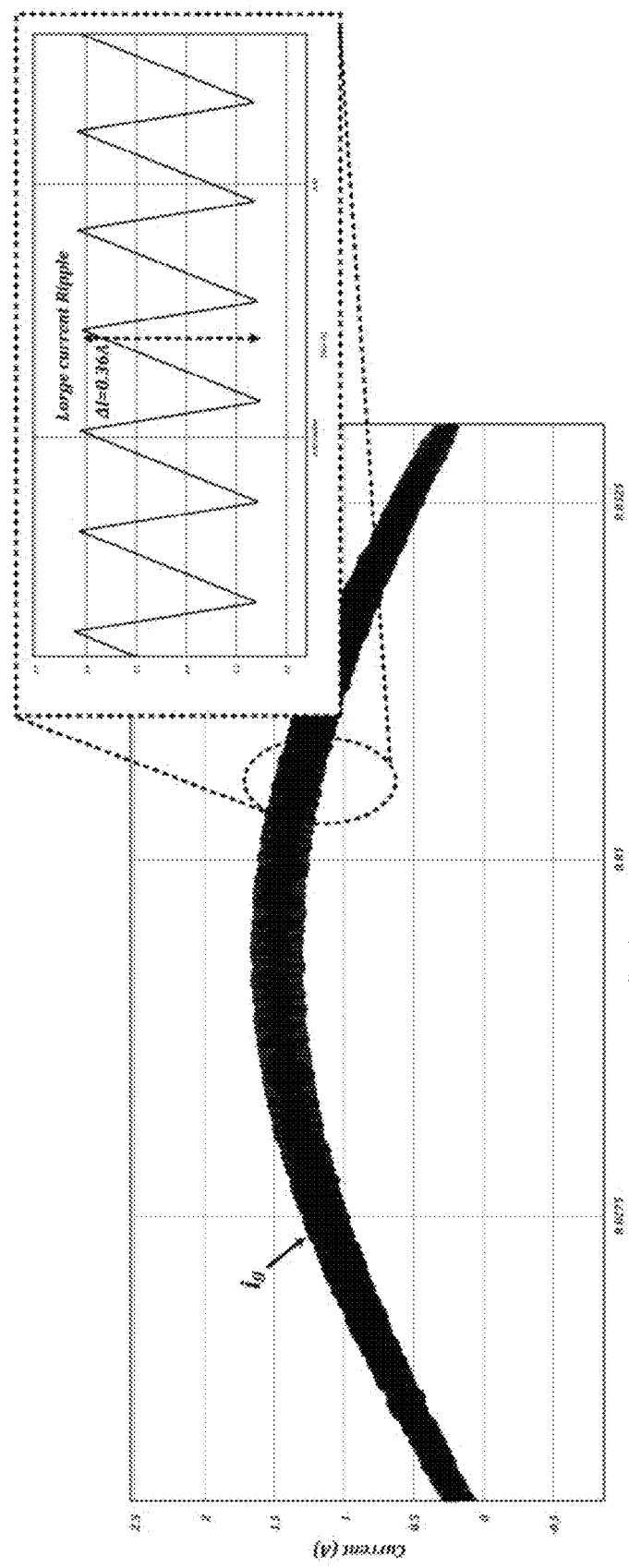
FIG. 10 illustrates the current ripple of the output inductor for a circuit according to the prior art.

FIG. 8 shows the waveforms for a converter using the circuits of the present invention. FIG. 8 depicts the auxiliary circuit current and the ZVS operation of the semiconductors, $S_1$ and $S_2$. In FIG. 9 the current ripple of the output inductor for the inverter with coupled inductors according to one aspect of the invention is illustrated. In FIG. 10 the current ripple for the output inductor in a conventional inverter under the same conditions is shown. As can be seen, FIG. 9 and FIG. 10 show that the current ripple is significantly attenuated by the present invention.

Figure 11:
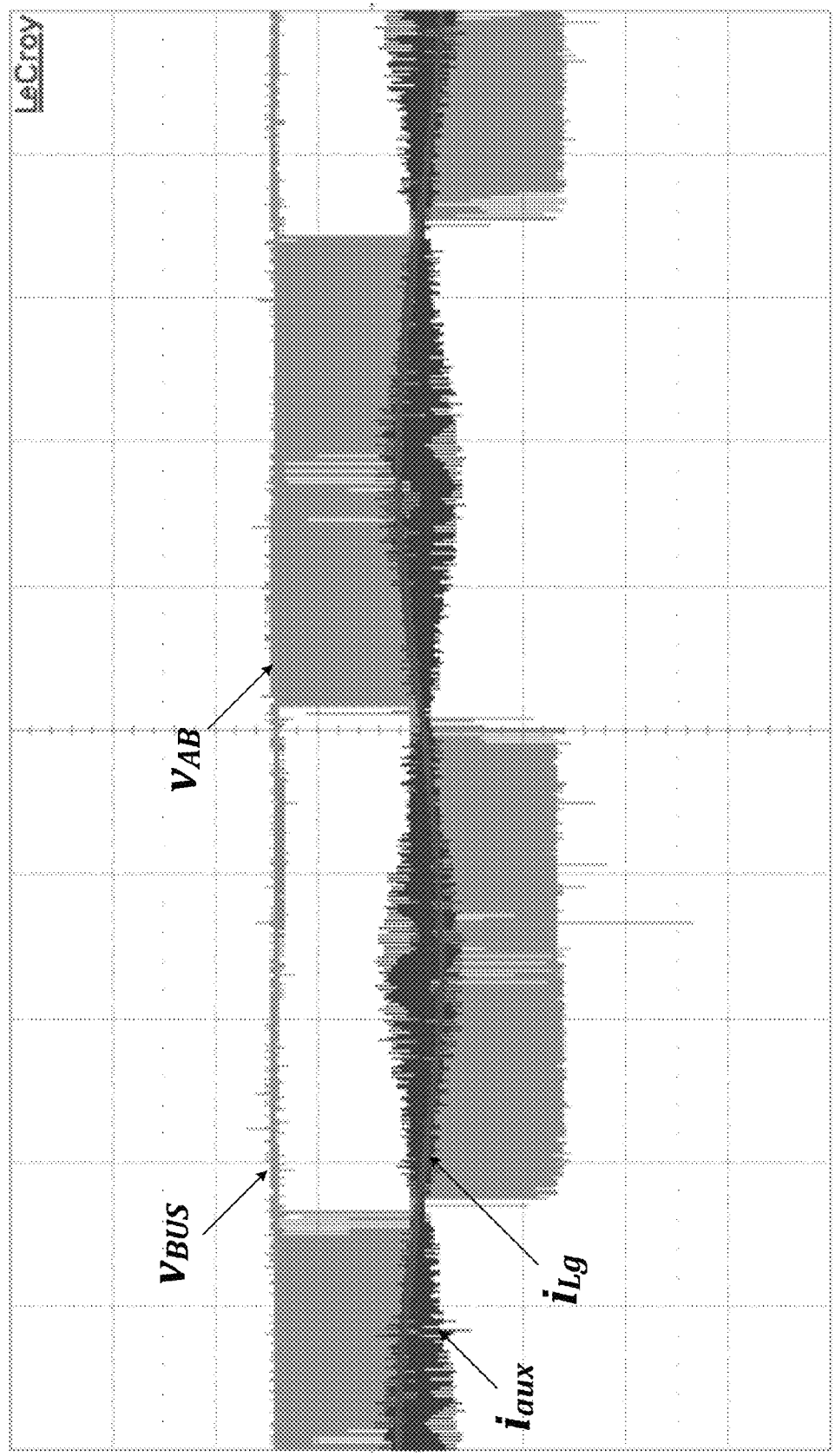
FIGS. 11 and 12 are experimental waveforms of the ZVS inverter and show a very low current ripple at the output of the inverter and demonstrate the soft-switching of the inverter.
Figure 12:
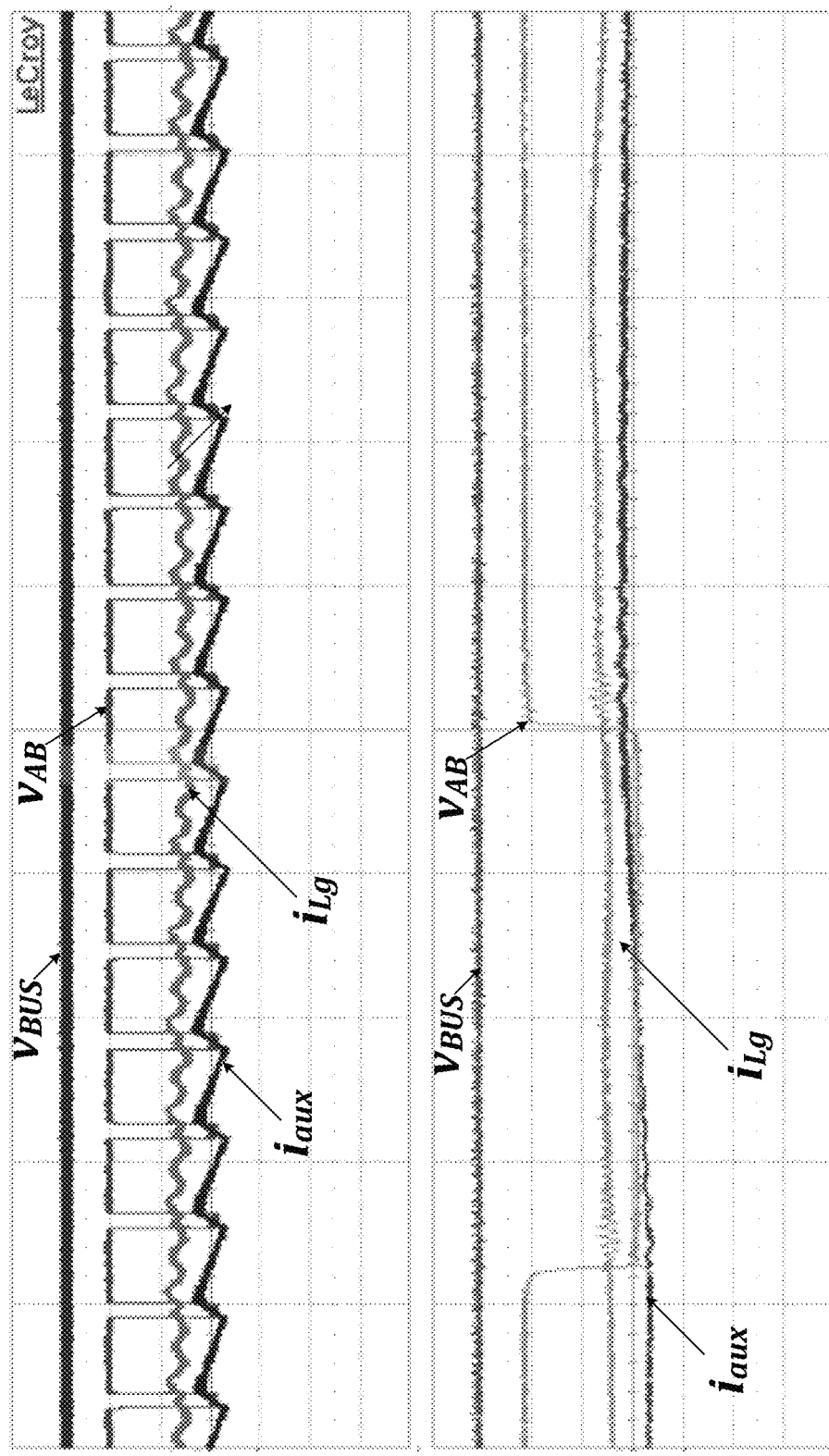

FIG. 11 and FIG. 12 show experimental waveforms of the ZVS inverter with reduced output current ripple as detailed in one aspect of the present invention. FIG. 11 and FIG. 12 demonstrate a very low current ripple at the output of the inverter and demonstrate the soft-switching of the inverter.

In another aspect of the invention, the system controller may be replaced or be used in conjunction with computer controlled hardware with suitable control software. As an example, the system controller may be replaced or used in conjunction with an application specific integrated circuit (ASIC) which has been suitably programmed to execute at least some of the functions of the controller.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A circuit comprising:
   a DC bus capacitor;
   a full bridge inverter coupled in parallel to said DC bus capacitor between a positive node and at a negative node;
   an output filter coupled to said full bridge inverter;
   an auxiliary circuit coupled to said inverter;
   wherein
   said full bridge inverter comprises a first leg and a second leg, each leg comprising a pair of power semiconductor subcircuits coupled in series to each other, said first leg having its pair of power semiconductor subcircuits being coupled to each other at a first coupling point, said second leg having its pair of power semiconductor subcircuits being coupled to each other at a second coupling point;
   said auxiliary circuit comprises an auxiliary inductor coupled in series to an auxiliary capacitor, said auxiliary circuit being coupled between said first coupling point and said negative node;
   said output filter comprises an inductor, said output filter being coupled between an output and said first coupling point, said output also being coupled between said output filter and said second coupling point;
   said second leg of said inverter is switched at a frequency of current in a power grid connected to said output.

2. A circuit according to claim 1 wherein said inductor is coupled to said auxiliary inductor.

3. A circuit according to claim 2 wherein said circuit is controlled by a control system comprising:
   a DC-bus voltage controller for receiving an input voltage and a feedback voltage and for controlling an intermediate current;
   a current controller receiving said intermediate current, said current controller being for preserving a direction of a control parameter d during each half line cycle transition, said control parameter being an output of said current controller;
   a pulse width modulator receiving said control parameter and an optimal frequency, said pulse width modulator being for determining control signals for power semiconductor subcircuits in said inverter;
   an optimal frequency calculator for receiving a grid current, a grid voltage, said control parameter, and outputs of said inverter circuit, said calculator being for calculating said optimal frequency.

4. A circuit according to claim 3 wherein said current controller comprises:
   a first multiplier block receiving said intermediate current;
   a second multiplier block receiving an output of said first multiplier block;

an inverse block for calculating an inverse of an input grid voltage, an output of said inverse block being multiplied by said first multiplier block with said intermediate current;

a sign block for extracting a sign of said input grid voltage, an output of said sign block being multiplied by said second multiplier block with said output of said first multiplier block;

a third multiplier block for multiplying a grid current with an output of said sign block;

an adder block for subtracting an output of said third output block from a result of said second multiplier block;

a PID (proportional-integral-derivative) controller for receiving an output of said adder block and for producing said control parameter d.

5. A circuit according to claim 3 wherein said pulse width modulator produces and controls gate signals for said power semiconductor subcircuits such that a duty ratio is switched at zero crossings of said grid voltage.

6. A circuit according to claim 1, wherein said first leg of said inverter is switched at a higher frequency than said frequency of current in said power grid.

7. A circuit according to claim 6 wherein said higher frequency is an optimal frequency calculated according to:

$$f_{sw}^{Opt} = \frac{(V_{dc} - |v_g|)d}{2L_{aux}\left(I_{ZVS} + \left|I_o - \frac{(V_{dc} - |v_g|)d}{2L_g}\eta\right|\right)}$$

where $$I_{ZVS} = C_{So}\frac{V_{dc}}{t_d}$$

and $$\eta = \frac{1 - L_M/L_{aux}}{1 - k^2};$$

$$k = \frac{L_M}{\sqrt{L_g L_{aux}}}$$

where
$L_M$ is a mutual inductance of the auxiliary inductor and the output inductor;
$L_g$ is a self inductance of the output inductor;
$L_{aux}$ is a self inductance of the auxiliary inductor;
$C_{so}$ is an equivalent output capacitance of said power semiconductor subcircuit;
$V_{dc}$ is an input voltage of the inverter;
$V_g$ is the grid voltage;
$t_d$ is a dead time between pulses of power semiconductors in said power semiconductor subcircuit;
d is the duty ratio.

8. A circuit according to claim 1 wherein said second leg of said inverter is switched at a frequency of voltage in a power grid connected to said output.

9. A circuit according to claim 8 wherein said first leg of said inverter is switched at a higher frequency than said frequency of current in said power grid.

10. A circuit according to claim 8 wherein said first leg of said inverter is switched at a higher frequency than said frequency of voltage in said power grid.

11. A circuit according to claim 1, wherein said first leg of said inverter is switched at a higher frequency than said frequency of voltage in said power grid.

12. A circuit according to claim 1 wherein said auxiliary inductor and said inductor in said output filter are coupled to one another.

13. A method for controlling a DC/AC converter having a full bridge inverter and being connected to a power grid, said inverter having a first and a second leg of power semiconductor subcircuits, the method comprising:
a) switching said power semiconductors in said second leg at a line frequency of said power grid;
b) switching said power semiconductors in said first leg at a frequency higher than said line frequency of said power grid;
c) providing an auxiliary circuit for providing soft switching to said power semiconductors in said first leg.

14. A method according to claim 13 wherein said converter circuit comprises:
a DC bus capacitor;
said full bridge inverter coupled in parallel to said DC bus capacitor between a positive node and at a negative node;
an output filter coupled to said full bridge inverter;
said auxiliary circuit coupled to said inverter;
wherein
said full bridge inverter comprises said first leg and said second leg, each leg comprising a pair of power semiconductor subcircuits coupled in series to each other, said first leg having its pair of power semiconductor subcircuits being coupled to each other at a first coupling point, said second leg having its pair of power semiconductor subcircuits being coupled to each other at a second coupling point;
said auxiliary circuit comprises an auxiliary inductor coupled in series to an auxiliary capacitor, said auxiliary circuit being coupled between said first coupling point and said negative node;
said output filter comprises an inductor, said output filter being coupled between an output and said first coupling point, said output also being coupled between said output filter and said second coupling point.

15. A method according to claim 14 wherein said auxiliary inductor and said inductor in said output filter are coupled to one another.

16. A method according to claim 13 wherein said higher frequency is an optimal frequency calculated according to:

$$f_{sw}^{Opt} = \frac{(V_{dc} - |v_g|)d}{2L_{aux}\left(I_{ZVS} + \left|I_o - \frac{(V_{dc} - |v_g|)d}{2L_g}\eta\right|\right)}$$

where $$I_{ZVS} = C_{So}\frac{V_{dc}}{t_d}$$

and $$\eta = \frac{1 - L_M/L_{aux}}{1 - k^2};$$

-continued $$k = \frac{L_M}{\sqrt{L_g L_{aux}}}$$

where $L_M$ is a mutual inductance of the auxiliary inductor and the output inductor;

$L_g$ is a self inductance of the output inductor;

$L_{aux}$ is a self inductance of the auxiliary inductor;

$C_{so}$ is an equivalent output capacitance of said power semiconductor subcircuit;

$V_{dc}$ is an input voltage of the inverter;

$V_g$ is the grid voltage;

$t_d$ is a dead time between pulses of said power semiconductors in said power semiconductor subcircuit;

d is the duty ratio.

17. A method according to claim 14 wherein said circuit is controlled by a control system comprising:

a DC-bus voltage controller for receiving an input voltage and a feedback voltage and for controlling an intermediate current;

a current controller receiving said intermediate current, said current controller being for preserving a direction of a control parameter d during each half line cycle transition, said control parameter being an output of said current controller;

a pulse width modulator receiving said control parameter and an optimal frequency, said pulse width modulator being for determining control signals for power semiconductor subcircuits in said inverter;

an optimal frequency calculator for receiving a grid current, a grid voltage, said control parameter, and outputs of said inverter circuit, said calculator being for calculating said optimal frequency.

18. A method according to claim 13 wherein said line frequency is selected from either a voltage frequency of said power grid or a current frequency of said power grid.

\* \* \* \* \*